(12) United States Patent
Richter et al.

(10) Patent No.: US 6,615,020 B2
(45) Date of Patent: Sep. 2, 2003

(54) COMPUTER-BASED INSTRUCTIONAL SYSTEM WITH STUDENT VERIFICATION FEATURE

(76) Inventors: David A. Richter, P.O. Box 5951, Scottsdale, AZ (US) 85261; Gene E Storz, II, 13270 N. 91$^{st}$ Pl., Scottsdale, AZ (US) 85260

( * ) Notice: Subject to any disclaimer, the term of this patent is extended or adjusted under 35 U.S.C. 154(b) by 0 days.

(21) Appl. No.: 09/815,749

(22) Filed: Mar. 23, 2001

(65) Prior Publication Data

US 2001/0036622 A1 Nov. 1, 2001

Related U.S. Application Data

(60) Provisional application No. 60/191,937, filed on Mar. 24, 2000.

(51) Int. Cl.$^7$ ................................................ G09B 3/00
(52) U.S. Cl. ..................... 434/350; 434/118; 434/362; 706/927; 707/102
(58) Field of Search ................................ 434/118, 169, 434/185, 307 R, 308, 319–324, 327, 334–336, 350, 362, 365; 713/200; 709/204, 224; 706/927; 345/329, 336, 357, 378, 501, 705; 382/186, 189, 321; 704/1; 708/142; 705/11; 379/93.28, 102.01; 348/14.07

(56) References Cited

U.S. PATENT DOCUMENTS

| | | | | |
|---|---|---|---|---|
| 5,458,494 A | * | 10/1995 | Krohn et al. | 379/102.01 |
| 5,546,598 A | * | 8/1996 | Yamaguchi et al. | 345/501 |
| 5,692,906 A | * | 12/1997 | Corder | 434/118 |
| 5,727,950 A | * | 3/1998 | Cook et al. | 345/705 |
| 5,823,788 A | * | 10/1998 | Lemelson et al. | 273/432 |
| 5,850,250 A | * | 12/1998 | Konopka et al. | 348/14.07 |
| 5,870,559 A | * | 2/1999 | Leshem et al. | 709/224 |
| 5,907,831 A | * | 5/1999 | Lotvin et al. | 434/322 |
| 5,915,973 A | * | 6/1999 | Hoehn-Saric et al. | 434/118 |
| 5,987,302 A | * | 11/1999 | Driscoll et al. | 382/321 |
| 6,024,577 A | * | 2/2000 | Wadahama et al. | 434/322 |
| 6,149,441 A | * | 11/2000 | Pellegrino et al. | 434/350 |
| 6,155,840 A | * | 12/2000 | Sallette | 434/323 |

* cited by examiner

Primary Examiner—Joe H. Cheng
(74) Attorney, Agent, or Firm—Gregory J. Nelson

(57) ABSTRACT

A computer-based distance learning system for teaching a student at a remote location. The student communicates with a teaching center. The student's identity and continued presence is monitored either continually or randomly using recognition continuing systems such as web cameras, biometric tags or other means. An audit trail for verification is provided. The student receives instruction leading to a degree or certification and the school district, in the case of pubic schools, receives "at seat" credit for funding.

18 Claims, 1 Drawing Sheet

COMPUTER-BASED INSTRUCTIONAL SYSTEM WITH STUDENT VERIFICATION FEATURE

This application is based on Provisional Application Ser. No. 60/191,937, filed Mar. 24, 2000, entitled "Computer-Based Instructional System With Student Verification Feature."

FIELD OF THE INVENTION

The present invention relates to a teaching system and more particularly to a teaching system through which a student at a remote location receives training and instruction by means of a computer. The system is applicable to a wide variety of instructional environments including public, private and home school education, as well as professional and industrial fields where continuing or periodic instruction is required.

BACKGROUND OF THE INVENTION

Many students today have encountered situations that have resulted in their having to leave public schools. Current statistics indicate that about 16% of the high school population do not complete high school. Students leave the traditional public schools for many reasons, including medical problems, truancy, drop out due to expulsion, pregnancy, family crisis or behavioral problems. The present invention provides a teaching or instructional system which provides these students, sometimes termed "at risk" students, the opportunity to obtain an accredited high school diploma. The invention also provides the school district the capability to enroll those students so as to obtain "seat time" credit.

The present invention enables the public schools to provide the non-traditional student with quality education and a diploma upon graduation without incurring the costs associated with traditional education. Further the system allows the school district to obtain and qualify for federal and other funding as the remote learning student is considered as being in "attendance." As a result, the school district receives credit as the remote student is counted as a regular class-attending student.

There are various learning systems that can be found in the prior art that enable a student at a remote location to receive instruction. The term "remote" refers to situations in which the student and teacher are at different locations. Some of the earlier systems simply used two-way telephone or radio communication between a teacher in a classroom and the remote student. These types of systems were primarily used in connection with students who had some type of medical disability and could not attend classes. More recently, various computer and assisted instructional delivery systems and methods have been developed. These systems may use an interactive monitor positioned at the student's location. Each interactive monitor displays instructional information in visual form. A network communications system communicates the instructional information as inputted and selectively displays the instructional information simultaneously onto the various student monitors. Patents describing systems of this general type include U.S. Pat. Nos. 5,176,520 and 5,437,555.

Systems of the type described above, which are representative of the prior art, do provide the remotely located student the opportunity to receive instruction, are subject to a number of short comings. One disadvantage is that many of these systems require the student to participate at a particular time, generally the time the class is being offered. This is often not convenient for students with medical problems or students who, because of family and personal problems, find it necessary to work or be away at times during the day and therefore cannot participate. Another problem is that while teaching systems of this type may impart the necessary information to the student and allow the student to be tested and graded and ultimately receive a diploma, the school districts do not receive "at seat" credit for such students. Accordingly, the school district is not entitled to funding from federal and other programs.

It is apparent there exists a need for an improved instructional system which student can access at convenient times and will benefit the school district by providing "at seat" credit for funding purposes.

BRIEF SUMMARY OF THE INVENTION

It is a broad object of the invention to provide a computer-based instructional system which includes a continual or random intermittent student recognition and identification system.

It is a further object of the present invention to provide a teaching system which enables schools to provide non-traditional students with quality education and a diploma upon graduation without incurring the costs associated with traditional education. The invention further allows the school district to obtain "at seat" or "seat time" credit for such student. The terms "at seat" or "seat time" mean periods when the student is present during an instructional period.

The present instructional system provides distance learning by means of a computer. Each enrolled student is supplied with Internet connectivity with the necessary computer equipment including a multi-media computer and video conferencing system for monitoring and communicating with the instructional program. Access to a computer system allows even the most economically disadvantaged students to participate. Instructional periods may be on a scheduled basis or on demand basis when the student's schedule allows the student to participate. Scheduled classes may be at a set time and may be taught in real time by an instructor or may be contained on a CD ROM or other software with a teacher available at the conclusion of the instructional period for questions and answers. The "on demand" classes may be accessed any time by students and live teachers are available for questions and answers at prescheduled times.

The student logs on or accesses the system by first providing precise identification such as a biometric scan. The presence of the student may be randomly or continually confirmed during the instructional period by biometrics, a web camera or by other means such as requiring the student to place his or her finger on a fingerprint pad or by periodically requiring a confirming action by the student.

BRIEF DESCRIPTION OF THE DRAWING

The above and other objects and advantages of the present invention will be more fully appreciated from the following description and drawings in which.

DETAILED DESCRIPTION OF THE DRAWING

Figure 1:
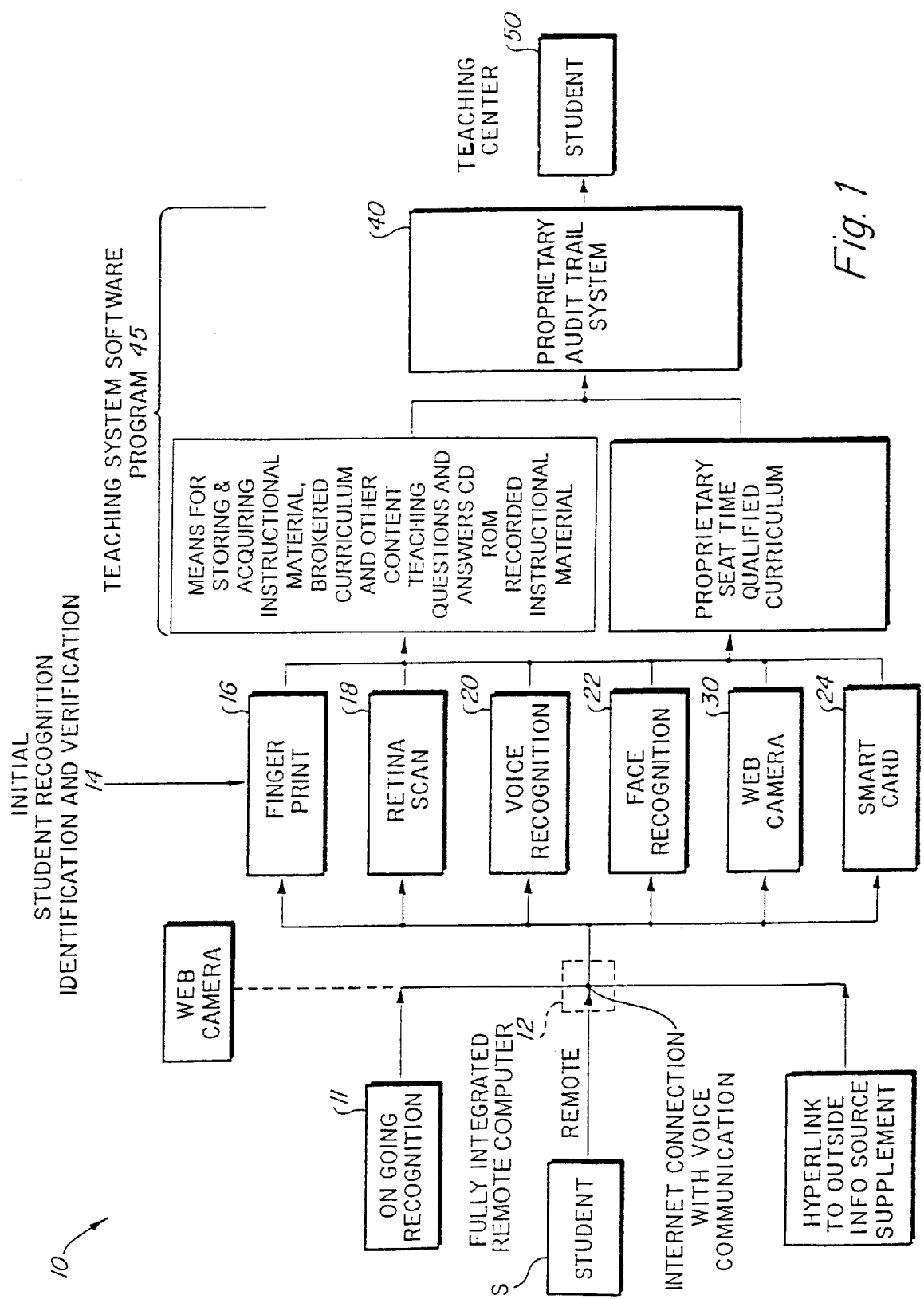
FIG. 1 is a schematic diagram illustrating the teaching and instructional system of the present invention.

The teaching system of the present invention is shown in schematic form in FIG. 1 and is a computer-based system in which a student is provided a computer at a remote location such as the student's home or other convenient location such as a library. In some cases, the computers will be available at convenient public locations such as school or public library. The system is Internet-based and is connected via a modem to a location such as a school or teaching center 50 where teachers are available at certain times and may be accessed on-line. Preferably the computer that is provided to the student is a dedicated computer usable only for the purpose of distance learning and does not allow the student to use the computer on the Internet for any other "surfing" purposes.

Briefly, the computer-based system 10 is available to a student S at a remote location. An initial student identification system 14 confirms the identity of the student. An ongoing recognition system 11 confirms the identity of the student. The teaching system software 45 communicates information regarding the curriculum and administers testing from the teaching center 50. The system also includes an audit trail 40.

An important part of the present invention is the provision of identification system 14 that insures that the enrolled student is, in fact, the individual using the computer and further that the enrolled student participates for the entire period of the instruction, as for example a 55 minute class period. In the educational profession this requirement is termed "at seat" and is used as a basis for funding of schools. Schools and school districts receive money from federal and other funding sources based on the number of "at seat" students that attend classes.

This verification system may be used for other training and education programs such as professions, regulated industries or fields where on-going training is required to maintain proficiency or certification.

Accordingly, the student computer 12 of the present invention is provided with a student identification system 14. The student may be identified by a biometric system which scans certain unique characteristics of the body to confirm identification which is necessary for the student to log on. For example, the biometric system may be a fingerprint scan 16, retinal scan 18, voice recognition 26, or facial recognition 22. These systems are sometimes termed "body-part identification tags" (ID Tags) and are available from companies such as Motorola in Chandler, Ariz., and Iriscan of New Jersey. As an alternative, the student may be provided with a smart card 24 containing a microchip which is entered into the system to initiate the instruction period.

The system may further be programmed to require the student, during the course of the instructional period, to periodically submit to the identification program. For example, the computer program may periodically or randomly provide a notice on the screen monitor that requires compliance in order for the session to continue. For example, the student will be notified that he or she must place his or her finger on a fingerprint pad or speak for voice recognition. This insures the student does not simply log on and then leave the computer unattended. If the student does not comply, the session may be terminated and the student is not credited for "seat time" for the session.

As an alternate to biometric recognition systems, the learning system of the present invention may provide a prompt on the computer screen requiring the student to strike a particular computer key during the course of instruction. The prompt may appear randomly at various times. If the key is not struck or if the biometric system does not confirm that the student is present, then the computer will shut down and the student will not receive credit for the particular class.

Other types of student ongoing identification systems may also be used. If the student is engaged in a session with a live instructor, a web camera 30 may be positioned so that it is focused on the student and records the student's continual presence during the teaching session. The video record may be maintained as evidence of the student's attendance. The ongoing recognition provides an audit trail 40 which will "certify" or "verify" the student's attendance for courses such as continuing education in professional fields such as law, medicine, accordingly, and others. The individual can meet these requirements by "attending" classes at the convenience of the student, it not being necessary to attend live seminars. A wide variety of classes can be made available at considerable savings.

If the teaching session is not a live session and the student has participated in an "on demand" class containing multimedia video streaming or one in which the classroom content is on a CD ROM accessed by the student, the student may, at selected times, participate in a live question and answer period which is scheduled. If the class is a "live class," the student may participate as a student in the same manner as when one is physically present in the classroom. During the question and answer periods, the student is in full two-way communication with the classroom or the teacher conducting the question and answer period.

The system of the present invention allows the student's attendance and participation to be monitored providing an audit trail system 40. The audit trail system 40 provides confirmation of the student's attendance, curriculum and performance so that the student may be credited by verifiable documentation of the successful completion of a course of study. Further, tests may be administered using the system with the test questions displayed on the screen and the student are responding to the test questions by entering the appropriate responses on the computer's keyboard or by use of a computer device such as a mouse.

In addition to student tracking and auditing, various teaching materials can also be provided to the student by means of the computer. Information such as books, articles and treatises in addition to test materials, can be communicated or made available to the student for viewing. Also, the system allows the student to be linked to other sources at the discretion of the teacher. For example, a student could be provided a hyperlink to a source such as Encyclopedia Britannica, or other research or supplemental resources which would assist the student in learning the material of the curriculum. The teaching system 45 provides brokered curriculum content which is any instructional content from outside sources.

The present invention provides a solution to the contemporary education problem by supplying a full turn key program to create a virtual school in a school district or for any type of training or continuing education. Through the present system, the student receives a complete multi-media computer system, curricula and support while providing the school increased student attendance, grade and progress tracking.

The benefits to the student, the school district and society are substantial. The student may continue his or her high school education and may eventually return to the public school or may graduate using the system. The student does not incur a lag time when away from school, which often causes students to become drop outs because of age or social pressure. Once a student has a high school education, they are much more equipped to obtain a better employment and perhaps move on to higher education.

The school district benefits by being able to provide a means to continue to educate the at risk student while maintaining communications and leading them to becoming productive members of society.

It will be apparent to those skilled in the art to make various changes, alterations and modifications to the system described herein. To the extent these various modifications, changes and alterations do not depart from the spirit and scope of the description set forth above, they are intended to be encompassed therein.

We claim:

1. A system for instructing a student at a remote location comprising:
   (a) a teaching center connected to a computer;
   (b) a student computer at the remote location in communication with the teaching center computer for presentation of instructional material during an instructional course period;
   (c) ongoing student recognition and identification means for initially identifying and confirming the presence of a particular student and for identifying and confirming the presence of a particular student during the instructional course period; and
   (d) audit trail means for tracking student progress and maintaining records of the time periods and dates of a student's instructional course periods.

2. The system of claim 1 wherein said teaching center and remote locations are in voice communication.

3. The system of claim 1 wherein said student recognition and identification means comprises biometric means.

4. The system of claim 3 wherein said biometric means are selected from the group consisting of a fingerprint scan, voice recognition or an anatomical scan.

5. The system of claim 1 wherein said student recognition and identification system comprises a web camera.

6. The system of claim 1 wherein said system includes software for course curricula, student tracking, student attendance and progress.

7. The system of claim 1 wherein said student recognition and identification means require the student to periodically perform a manipulation during the instructional course period.

8. The system of claim 1 wherein said instructional material is provided on electronic recording media.

9. The system of claim 8 wherein said teaching center provides live scheduled instructional periods during which students can participate in a question and answer exchange.

10. The system of claim 8 wherein the electronic recording media is a compact disc.

11. The system of claim 1 wherein said instructional material includes hyper links to selected web sites.

12. An instructional system for instructing a student during an instructional period comprising:
   (a) an instructional center connected to a computer;
   (b) a student computer at a remote location for delivering instructional material to the student during an instructional course period;
   (c) unique student identification means for identifying the presence of a particular student and activating the system permitting access to the material only when said student identification is confirmed;
   (d) on-going recognition means for recognizing the presence of the particular student during the instructional period; and
   (e) audit trail means for tracking student progress and maintaining records of time and duration of student attendance during instructional course periods.

13. The system of claim 12 wherein said on-going recognition means provides data which is stored to establish an audit trail.

14. The system of claim 12 wherein said instructional center is selected from the group consisting of private schools, technical schools, public schools and professional continuing education centers.

15. The system of claim 12 wherein said instructional center and said student computer are in communication via a global computer communications network.

16. The system of claim 12 wherein said student computer is linked to selected web sites to provide instructional material to the student.

17. The system of claim 12 wherein said computer at said instructional center provides both instructional material and testing to the student.

18. The system of claim 12 wherein said on-going recognition means is selected from the group consisting of biometrics, body scan, voice recognition and image recognition.

* * * * *